United States Patent [19]
Steele

[11] Patent Number: 4,463,056
[45] Date of Patent: Jul. 31, 1984

[54] THERMOPLASTIC CONTAINER PARISON
[75] Inventor: Scott W. Steele, Toledo, Ohio
[73] Assignee: Owens-Illinois, Inc., Toledo, Ohio
[21] Appl. No.: 314,642
[22] Filed: Oct. 26, 1981
[51] Int. Cl.³ .................... B65D 1/00; B65D 85/70
[52] U.S. Cl. ............................ 428/542.8; 428/35; 264/523; 425/526
[58] Field of Search .................. 215/31; 428/35, 542.8
[56] References Cited

U.S. PATENT DOCUMENTS

| | | | |
|---|---|---|---|
| 1,579,942 | 4/1926 | Jensvold | 215/337 |
| 2,169,686 | 8/1939 | Fabrice | 215/254 |
| 4,007,848 | 2/1976 | Snyder | 215/307 |
| 4,007,851 | 2/1977 | Walker | 215/307 |
| 4,177,906 | 12/1979 | Von Hagel | 215/31 |
| 4,199,629 | 4/1980 | Aqrawal et al. | 428/35 |
| 4,330,579 | 5/1982 | Ota et al. | 428/35 |

Primary Examiner—William R. Dixon, Jr.
Attorney, Agent, or Firm—Thomas L. Farquer; M. E. Click

[57] ABSTRACT

A thermoplastic, generally tubular parison for the blow molding of a thermoplastic container and a method and apparatus for same. The parison includes a finish or neck having a single helical thread extending less than 360° about the circumference of the finish. The radius of the parison at any point on the outside surface is less than the radius through the crest of the helical thread, whereby the parison can be injection molded in an injection molding apparatus with an injection mold comprising all axially movable mold sections.

2 Claims, 4 Drawing Figures

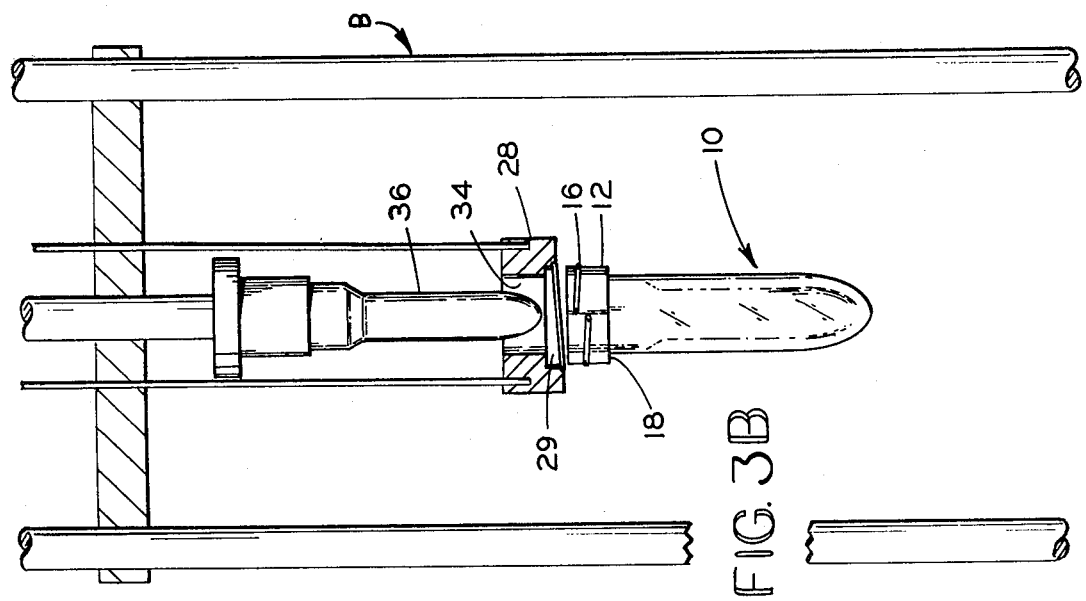
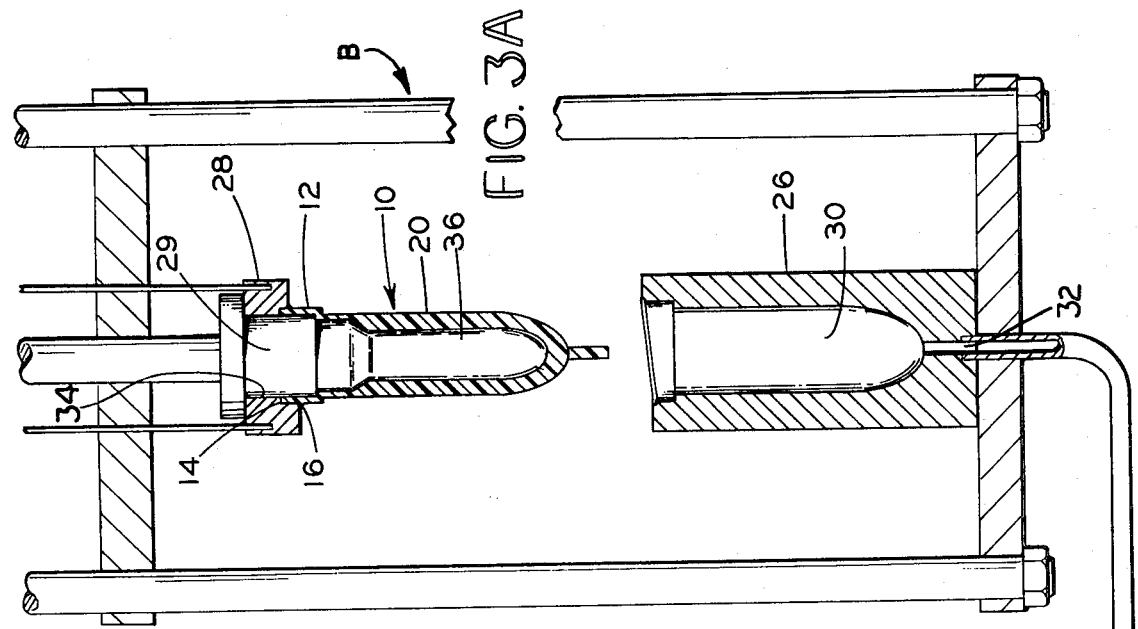

THERMOPLASTIC CONTAINER PARISON

DESCRIPTION

1. Technical Field

The present invention relates to a thermoplastic parison and a method and apparatus for manufacture thereof, such parison to be blow molded into a hollow unitary container. The parison includes a exteriorally threaded finish with a configuration allowing the parison to be injection molded in a simplified molding process. The invention also provides a container with a gas flow path between the container finish thread and a screw-type closure. Such a flow path is advantageous when used with containers which hold pressurized fluids, such as carbonated beverages.

2. Background Art

Thermoplastic containers, such as those formed from polyethylene terephthalate, are becoming increasingly important in the marketplace as carbonated beverage containers. In the manufacture of typical containers with exteriorly located threaded finishes, a parison is formed by injection molding as an intermediate step in the production of the final blow molded container. The parison includes an exteriorly threaded finish portion in a configuration which defines the finish of the completed container. The parison also includes a relatively thick-walled tubular portion which is to be blow molded to form the hollow main body portion of the container.

Known injection molding machines for forming such parisons include two molding apparatus members. A first member is a stationary multi-cavity mold. A second member is a neck ring assembly. The neck ring assembly includes a pair of radially movable neck ring halves. The neck ring halves are disposed around a centrally located, axially movable core pin. Each mold cavity defines the outer cylindrical surfaces and the closed end of the main body portion of the parison. The core pin of the neck ring assembly defines the interior cylindrical dimension of the parison. The neck ring halves define the upper portion or so-called finish of the parison, including the externally disposed threads of the finish.

The radially movable neck ring halves necessitate an injection molding apparatus of increased size and mechanical complexity in order that the neck ring halves be seperable radially one from another to disengage the fully molded parison finish.

The above described known injection molding apparatuses require that the neck ring halves be spaced sufficiently far apart, on centers, that the neck ring halves may be radially moved apart. The radial movement of the neck ring halves allows for the disengagement of the finish of the parison from the rings. The radial movement must be radially wide enough to expose the entire finish of the parison, including any outstanding handling rings on the finish, to allow the parison to be stripped from the core pin by the axial movement of the core pin. The present invention provides for an improved injection mold structure which does not require mold cavitation sufficiently spaced apart to allow radial splitting of the neck ring halves to free the parison finish for ejection. Rather, the present invention provides for an improved configuration wherein the necessity to radially move any mold members is obviated. Further, the improved mold configuration makes possible the new parison configuration dislcosed herein.

Also a problem common to threaded closures for containers for use with pressurized fluids is the possibility of premature closure release. As the closure is rotated during removal, the seal between the closure threads and the finish threads is broken. The head space pressure of the container is then applied to the interior surfaces of the closure attempting to spontaneously remove the closure from the finish. As the closure is rotated to full removal, thread engagement between the closure and the finish inhibits or prevents the venting of internal pressure downwardly between the finish and the inside surface of the closure. If the threads on the closure are not well formed, the internal pressure of the container contents may be sufficient to overcome the remaining thread engagement. Such premature release can strip the closure from the container.

In the past various parisons and finish designs have been proposed to simplify parison formation. U.S. Pat. No. 4,007,848 discloses a bottle finish having a discontinuous thread structure to facilitate venting of internal pressure of a container. The finish also includes a cap-locking band which extends radially beyond the outermost radial dimension of the threads.

The U.S. Pat. No. 4,007,851 discloses a closure and associated bottle finish. The finish includes angled threads which terminate in a radially outstanding cap-locking band. The closure includes pressure release ports to prevent premature closure release by venting carbonation pressure from the container through the finish.

U.S. Pat. No. 1,579,942 discloses a container finish including a plurality of circumferentially spaced locking lugs outwardly projecting from the annular surface of the finish. The finish teminates in an undercut edge.

U.S. Pat. No. 2,169,686 discloses a bottle finish having a plurality of spaced apart, helical threads. Each such thread is discontinuous. The finish terminates in a radially extending flange which extends outwardly of the main exterior wall of the finish and acts as a pilfer-proof locking means.

DISCLOSURE OF THE INVENTION

A parison according to the invention may be produced by injection molding in an injection mold according to the present invention including only relatively axially movable mold members with no radially movable mold members.

The threaded finish of the parison includes a single thread extending less than 360° around the finish. The mold parting line between the axially movable mold sections follows the radially outermost crest of the thread from one termini to the other and thereafter extends between the termini of the thread. Hence, the thread is formed between two axially movable mold sections eliminating the necessity for radially movable, split mold neck rings.

Further, the need to adjust cavitation of the mold to accommodate increased on center cavity distance is obviated. The mold structure of the present invention allows for closer on center spacing of the cavities. This increases production per mold block while reducing neck ring structure complexity.

The single thread structure of the finish not only permits molding of the parison in a simplified injection mold, but also provides an axial gas venting path between the termini of the thread. This militates against premature closure release due to high internal carbonation pressures forcing early disengagement of the closure.

The threaded finish portion of the parison is desirably of a greater diameter than the remaining tubular body portion which is to be blow molded to form the main body of the container. The transition area between the tubular body portion and the relatively larger diameter finish portion comprises a sharp undercut annular shoulder. In the final container, the undercut annular shoulder provides a surface for engagement of a tamperproof band and facilitates handling of the neck of the container.

Other objects and advantages of the invention will become readily apparent to one skilled in the art from the following detailed description of the preferred embodiments considered in connection with the accompanying drawings.

BRIEF DESCRIPTION OF THE DRAWINGS

FIGS. 3A and B are schematic views illustrating the operation of a blow molding apparatus incorporating the novel blow mold structure of the present invention.

Figure 1:
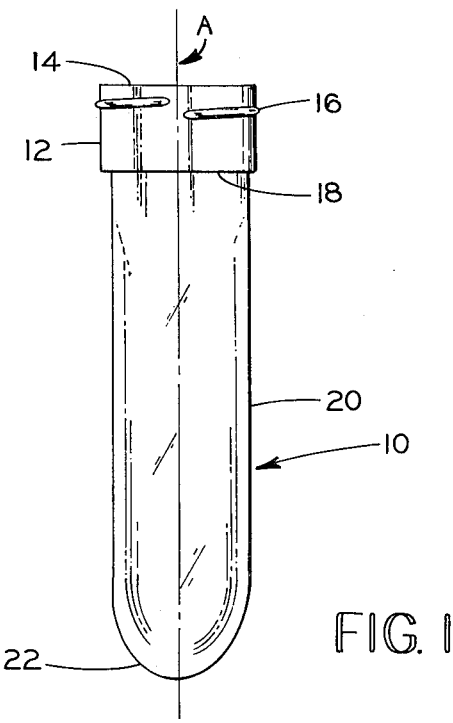
FIG. 1 is a side elevational view of a parison embodying the features of the present invention.

INVENTION AND THE BEST MODE OF CARRYING OUT THE INVENTION IN THE PREFERRED EMBODIMENT

A parison 10 embodying the invention is injection molded as an intermediate step in the manufacture of a blow molded organic thermoplastic container. The container to be formed from the parison 10 has a configuration including an externally threaded finish, a relatively large main container body portion and a neck portion tapering downwardly and outwardly of the finish to merge with the lower main container body portion. No example of the final container shape is illustrated in as much as the ultimate shape of the final container is dependent upon the geometry of the blow mold.

An annular finish 12 of the parison 10 has the same configuration as the finish of the final blow molded container. The finish 12 has an upper annular rim 14 defining the open end of the parison 10, which will become the fluid dispensing opening of the resulting container. The finish 12 comprises a hollow right circular cylinder having a continuous, single lead, helical thread 16. The thread 16 is disposed on the exterior of the finish 12. The thread 16 extends approximatley 350° about the circumference of the exterior of the finish 12. The termini of the thread 16 do not overlap or contact each other at any point. The intertermini space provides a gas vent path and accordingly a release means for the internal pressure of the container contents.

The lower edge of the finish 12 is defined by a downwardly facing, undercut shoulder 18. The shoulder 18 provides an abrupt transition between the lowermost portion of the finish 12 and a relatively smaller outside diameter lower tubular portion 20 of the parison 10. The lower tubular portion 20 has an outside cylindrical surface which inwardly tapers toward the bottom of the parison 10 to form a closed bottom end 22. For ease of mold cavity extraction, the lower tubular portion 20 of the parison 10 can be inwardly tapered from near the finish shoulder 18 to the closed bottom end 22. It should be understood by those skilled in the art that the length, thickness and other dimensional relationships of the lower portion 20 of the parison 10 will be determined by the shape of the ultimate container to be blown and that the drawings illustrate only a typical example of such a parison.

It is necessary to the invention that the crest of the thread 16 is at the furthest radial displacement from the centerline "A" (shown at FIGS. 1 and 2) of any point along the parison. Accordingly, the greatest radius from the centerline "A" of the tubular parison 10 to a point on its outer surface is at the crest of the thread 16. Due to the configuration of the parison 10, with the crest of the thread 16 being the greatest radial displacement, such radius defined by any other point on the outside surface of the parison 10 is less than the radius through the crest of the thread 16. Hence, since the most radially projecting part of the parison 10 is the crest of the thread 16, which forms the parting line between the mold cavity and the neck ring, the outside surface of the parison 10 can be formed in an injection mold having only axially movable mold sections. The parison 10 can be stripped from such mold without interference between the parison 10 and the mold members.

Figure 2:
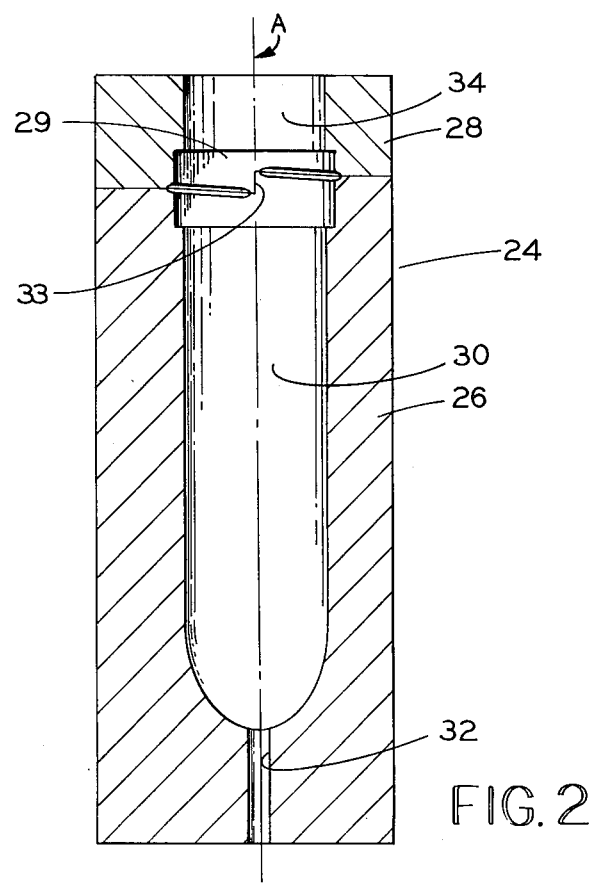
FIG. 2 is a sectional schematic view of an injection mold for injection molding of the parison according to the present invention.

Such an injection mold 24 is shown schematically in FIG. 2. It will be understood by those skilled in the art that any number of molds may be formed together in one mold block. For purposes of illustration, only one injection mold 24 is illustrated. The mold 24 comprises a lower, or first, mold section 26 and an upper, or second, mold section 28. The mold section 26 includes a cavity 30 defining the lower tubular portion 20, the annular shoulder 18 and a portion of the finish 12, below the crest of the thread 16. A gate 32 is formed in mold section 26 at its lower end for allowing injection of molten thermoplastic material into the closed mold to form the parison 10.

The upper mold section 28 includes a cavity 29 defining the upper half of the thread 16 above the crest of the thread and the portion of the finish 12 above the crest of the thread 16, including the annular rim 14. As illustrated in FIG. 2, the mold parting line 33 forms the crest of the thread 16 and extends between the termini of the thread to form a completely circular mold interface.

FIG. 3A illustrates in schematic fashion an injection molding apparatus "B" including the mold supporting and carrying tie bars and platens with the associated molten plastic supply station. The inside surface of the parison 10 is defined by an axially movable core pin 36 in the mold 24. As illustrated, the core pin 36 is insertable through an aperture 34 in the upper mold section 28 and thusly into the cavity 30. The core pin 36 typically tapers downwardly and inwardly from the finish, thereby defining a thicker parison wall in the lower tubular portion 20 of the parison 10. The thicker wall is necessary to provide sufficient thermoplastic material for radial expansion of the parison during the blow molding operation. The taper of the parison is so chosen that the resultant molded container has a uniform wall thickness if desired. However, the shape of the lower portion 20 of the parison 10 and the shape of the core pin 36 are determined by the ultimate container to be formed.

As is known, when a parison cools to form a solidified, self supporting structure within an injection mold like injection mold 24, it contracts into tight engagement with the core pin 36. In a typical previous apparatus, the parison, split neck ring and core pin are removed from the cavity 30. Subsequently, the neck rings are radially split or displaced from one another to expose the threaded finish. Then, the parison is stripped from the core pin to be collected.

Alternatively, in the past the core pin may be withdrawn from the molded parison while the neck rings still retain the parison therebetween. In such an apparatus, the parison can then be completely ejected from the mold only when the neck rings are radially shifted to release the parison. In previous apparatuses a substantial radial displacement of the neck ring halves must occur in order to collect the solidified parison. The present invention obviates such radial displacement and thus allows a greater number of cavities per unit surface area of the cavity bearing surface of the mold block. This results in increased production per injection cycle. Also, the need for partable neck rings in the associated radial motion causing devices is eliminated. A more simple and reliable injection mold is possible.

The configuration of the parison 10 illustrated and described permits a simple method of ejecting or stripping the mold from the core pin 36. First, as illustrated best in FIG. 3A, the parison 10, the core pin 36 and the upper mold section 28 are withdrawn axially from the cavity 30. The upper mold section 28 is then axially shifted away from the core pin 36 in the direction of the closed end of the parison. This motion strips the parison 10 from the core pin and completely ejects it from the mold 24, as illustrated best in FIG. 3B.

In operation, one complete parison molding cycle includes the following steps. The upper mold section 28 and the core pin 36 are moved axially into snug engagement with the lower mold section 26 to form a closed mold. Next, a molten thermoplastic charge is fed from the molten plastic supply station into cavity 30 through gate 32 by conventional feeder means (not shown). When sufficient molten plastic is injected into the space between the exterior of the core pin 36 and the interior of the upper mold section 28 and the interior of the lower mold section 26, the feeder means is disengaged. Sufficient time is allowed for the molten plastic to solidify so that a self supporting parison 10 can be extracted from the mold upon opening. After the cooling cycle is completed, the upper mold section 28 is moved axially away from the lower mold section 26. Due to the interference fit between the upper mold section 28 and the flange of the core pin 36, when the section 28 moves axially away from the cavity so does the core pin 36. When the section 28 is retracted with core pin 36 sufficiently, the core pin 36 can be moved further axially away from the cavity 30 to strip the parison 10 for collection. Alternatively, the upper mold section 28 can be moved axially toward the cavity 30 and thus strip the parison 10 from the core pin 36. It will be appreciated if the forward axial motion of the section 28 is used to strip parison 10 from core pin 36, the core pin—upper mold section assembly must be moved further from the cavity 30 to prevent re-entry of the parison 10 into the cavity 30 when stripping occurs.

As described, the parison 10 can be manufactured in an injection molded apparatus incorporating less expensive and trouble free tooling than a conventional machine.

Moreover, a container blown from the parison 10 incorporates additional features. A common problem concerning threaded closures for containers of carbonated beverages is the possibility of premature closure release. If the head space pressure due to carbonation is not vented rapidly during the closure removal, the closure can be prematurely released from the container by a stripping of the closure from the finish threads. To militate against such premature closure release, the gap between the termini of the single thread 16 of the finish 12 provides an axial gas flow path for venting the head space pressure, between the exterior surface of the finish 12 and the inside surface of the associated closure. Thus, the initial rotation of a threaded closure will raise the inside of the closure top panel enough to unseal it from the internal seal before the thread is disengaged. This provides an early path for gas venting to release the internal pressure before the closure can be removed from the finish.

The annular shoulder 18 provides not only a bead for engagement of a conventional tamperproof band associated with many closures but also facilitates handling of the neck ring of the bottle. The necessity for a separate handling flange, which would interfere with axial removal of the parison from the mold, is eliminated.

In view of the disclosure, various modifications consistent with the spirit of the invention will be apparent to those of ordinary skill in the art. The scope of the invention is to be determined solely by the appended claims.

I claim:

1. An injection molded thermoplastic parison comprising a tubular body portion having an open end and a closed end, said open end defined by a finish portion having a single helical thread extending less than 360° around the circumference of said finish, the radius of said parison from its central axis to a point on its outer surface being greatest through the crest of said thread and the radius of every other point on the outside surface of said parison being less than said greatest radius with each point further from said thread crest toward the closed end of said parison being greater than or equal to a more distant point from said thread crest.

2. The parison defined in claim 1 wherein said finish has a larger outside diameter than the remainder of said parison and terminates in an undercut annular shoulder axially facing said closed end of said parison.

* * * * *